United States Patent
Zhang et al.

(10) Patent No.: US 12,512,944 B2
(45) Date of Patent: Dec. 30, 2025

(54) INFORMATION MANAGEMENT METHOD, SECONDARY NODE CHANGING METHOD, NODE, AND STORAGE MEDIUM

(71) Applicant: ZTE Corporation, Shenzhen (CN)

(72) Inventors: Yan Zhang, Shenzhen (CN); Chengfu Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 450 days.

(21) Appl. No.: 17/622,510

(22) PCT Filed: Jun. 22, 2020

(86) PCT No.: PCT/CN2020/097420
§ 371 (c)(1),
(2) Date: Dec. 23, 2021

(87) PCT Pub. No.: WO2020/259435
PCT Pub. Date: Dec. 30, 2020

(65) Prior Publication Data
US 2022/0248294 A1    Aug. 4, 2022

(30) Foreign Application Priority Data

Jun. 24, 2019 (CN) .......................... 201910550193.0

(51) Int. Cl.
*H04L 5/00* (2006.01)
*H04W 36/00* (2009.01)
(Continued)

(52) U.S. Cl.
CPC ..... *H04L 5/0053* (2013.01); *H04W 36/00698* (2023.05); *H04W 36/00835* (2018.08);
(Continued)

(58) Field of Classification Search
CPC ......... H04W 36/008375; H04W 36/08; H04W 76/30; H04W 36/00835; H04W 36/0069;
(Continued)

(56) References Cited

U.S. PATENT DOCUMENTS 9,743,448 B2 * 8/2017 Futaki .................. H04W 72/23
2010/0272050 A1 * 10/2010 Lim ........................ H04W 8/22
370/329
(Continued)

FOREIGN PATENT DOCUMENTS

| CN | 102769877 A | 11/2012 |
|----|-------------|---------|
| CN | 104811924 A | 7/2015  |

(Continued)

OTHER PUBLICATIONS

Wen et al., EPO website translation of "Method for managing user device historical information for dual connectivity systems" (CN 104,811,924 A), SIPO, whole document (Year: 2018).*
(Continued)

*Primary Examiner* — Michael Thier
*Assistant Examiner* — Jose L Perez
(74) *Attorney, Agent, or Firm* — Vivacqua Crane, PLLC

(57) ABSTRACT

An information management method, a secondary node (SN) changing method, a node and a non-transitory computer-readable storage medium are disclosed. The information management method may include: recording, after a secondary node is added to user equipment, history information for the user equipment by the secondary node.

15 Claims, 6 Drawing Sheets

(51) Int. Cl.
   *H04W 36/08* (2009.01)
   *H04W 76/30* (2018.01)
(52) U.S. Cl.
   CPC ... *H04W 36/008375* (2023.05); *H04W 36/08* (2013.01); *H04W 76/30* (2018.02)
(58) Field of Classification Search
   CPC ..... H04W 76/15; H04W 92/20; H04W 48/16; H04W 36/0033; H04W 36/00698; H04L 5/0053
   See application file for complete search history.

(56) References Cited

U.S. PATENT DOCUMENTS

| | | | | |
|---|---|---|---|---|
| 2016/0142948 A1* | 5/2016 | Bergström | ............ | H04W 24/08 370/332 |
| 2016/0338131 A1* | 11/2016 | Godin | ................... | H04L 5/0098 |
| 2017/0223762 A1* | 8/2017 | Worrall | ................. | H04W 24/10 |
| 2018/0199242 A1* | 7/2018 | Deng | ................... | H04L 5/0098 |
| 2018/0310356 A1* | 10/2018 | Futaki | ................... | H04W 76/15 |
| 2018/0332507 A1* | 11/2018 | Fujishiro | ......... | H04W 36/00692 |
| 2019/0261231 A1* | 8/2019 | Sivavakeesar | .... | H04W 36/0066 |
| 2019/0281650 A1* | 9/2019 | Wu | .................... | H04W 36/0033 |
| 2020/0107390 A1* | 4/2020 | Hwang | ................... | H04W 8/02 |
| 2020/0196232 A1* | 6/2020 | Drevö | ................... | H04W 76/15 |
| 2020/0275498 A1* | 8/2020 | Fiorani | ................. | H04W 76/11 |
| 2020/0296637 A1* | 9/2020 | Teyeb | ..................... | H04L 5/001 |
| 2020/0389823 A1* | 12/2020 | Xu | ......................... | H04W 76/15 |
| 2021/0127451 A1* | 4/2021 | Yilmaz | ................... | H04W 8/08 |
| 2021/0211898 A1* | 7/2021 | Liu | ........................ | H04W 24/02 |
| 2022/0053392 A1* | 2/2022 | Wang | ................ | H04W 36/0079 |
| 2022/0053598 A1* | 2/2022 | Peng | ..................... | H04W 24/02 |
| 2022/0151000 A1* | 5/2022 | Virtej | .................... | H04L 5/0051 |
| 2022/0167215 A1* | 5/2022 | Hu | ........................ | H04W 24/10 |
| 2022/0369194 A1* | 11/2022 | Arshad | ......... | H04W 36/008375 |
| 2024/0032135 A1* | 1/2024 | Cheng | ................... | H04W 24/10 |

FOREIGN PATENT DOCUMENTS

| | | | | |
|---|---|---|---|---|
| CN | 104811924 B | * | 7/2018 | ............ H04W 36/08 |
| CN | 109691169 A | | 4/2019 | |
| JP | 2015177424 A | | 10/2015 | |
| KR | 20150053941 A | | 5/2015 | |
| WO | 2014054202 A1 | | 4/2014 | |
| WO | 2016163544 A1 | | 10/2016 | |
| WO | 2018111158 A1 | | 6/2018 | |

OTHER PUBLICATIONS

International Searching Authority. International Search Report and Written Opinion for PCT Application No. PCT/CN2020/097420 and English translation, mailed Aug. 26, 2020, pp. 1-10.

3GPP Technical Specification Group Radio Access Network. "Text proposals for handling user inactivity in dual connectivity release 13," 3GPP TSG-RAN WG3 Meeting #88, May 25-29, 2015, pp. 1-4.

3GPP Technical Specification Group Radio Access Network. "UE throughput history information," 3GPP TSG-RAN WG3 Meeting #87, Feb. 9-13, 2015, pp. 1-5.

3GPP Technical Specification Group. "3rd Generation Partnership Project; Overall description; Stage 2 (Release 15)," 3GPP Technical Specification Group Radio Access Network, Evolved Universal Terrestrial Radio Access (E-UTRA) and Evolved Universal Terrestrial Radio Access Network (E-UTRACN), 2019, pp. 1-363.

3GPP Technical Specification Group. "3rd Generation Partnership Project; X2 application protocol (X2AP)," 3GPP Technical Specification Group Radio Access Network, Evolved Universal Terrestrial Radio Access Network (E-UTRAN), 2019, pp. 1-414.

European Patent Office. Extended European Search Report for EP Application No. 20830934.4, mailed Jul. 1, 2022, pp. 1-20.

3GPP Technical Specification Group Radio Access Network. "Text proposals for handling user inactivity in dual connectivity release 13," 3GPP TSG-RAN WG3 Meeting #88, May 2015, pp. 1-4.

3GPP Technical Specification Group Radio Access Network. "UE throughput history information," 3GPP TSG-RAN WG3 Meeting #87, Feb. 2015, pp. 1-5.

Japan Patent Office. Office Action for JP Application No. 2021-277159 and English translation, mailed Nov. 8, 2022, pp. 1-8.

The State Intellectual Property Office of People's Republic of China. First Office Action for CN Application No. 201910550193.0 and English translation, mailed Oct. 24, 2022, pp. 1-18.

The State Intellectual Property Office of People's Republic of China. First Search Report for CN Application No. 201910550193.0 and English translation, mailed Oct. 17, 2022, pp. 1-6.

3GPP Technical Specification Group Radio Access Network. "Discussion on Secondary Node Change Procedures," 3GPP TSG-RAN WG3 Meeting #96, May 2017, pp. 1-4.

Korean Intellectual Property Office. First Office Action for KR Application No. 10-2021-7042353 and English translation, mailed Mar. 15, 2024, pp. 1-19.

* cited by examiner

INFORMATION MANAGEMENT METHOD, SECONDARY NODE CHANGING METHOD, NODE, AND STORAGE MEDIUM

CROSS-REFERENCE TO RELATED APPLICATION

This application is a national stage filing under 35 U.S.C. § 371 of international application number PCT/CN2020/097420, filed on Jun. 22, 2020, which claims priority to Chinese patent application No. 201910550193.0 filed on Jun. 24, 2019. The contents of these applications are incorporated herein by reference in their entirety.

TECHNICAL FIELD

The present disclosure relates to an information management method, a secondary node changing method, a node, and a non-transitory computer-readable storage medium.

BACKGROUND

At the early stage of network construction of the 5th Generation (5G) mobile communication technology, when deploying 5G hotspots on the basis of Long Term Evolution (LTE) networks, it is possible to build only 5G base stations and then connect 5G radio systems to LTE networks in the existing technology, which enables rapid deployment of 5G systems. The dual connectivity technology enables collaboration between LTE and 5G systems, which is helpful to improve the user speed. In order to distinguish dual connectivity (DC) in LTE systems, in standard protocols, dual connectivity technologies of the 4th Generation (4G) and 5G mobile communication technology are called Multi-Radio Dual Connectivity (MR-DC), which also includes dual connectivity in New Radio (NR). Herein, MR-DC, that is, Multi-Radio Dual Connectivity, refers to 4G and 5G dual connectivity technology. The MR-DC protocol defines two architectures.

MR-DC with EPC, that is, E-UTRA-NR Dual Connectivity (EN-DC), provides services for Non-Standalone (NSA) terminals with an eNB as a master node and a gNB as a secondary node.

MR-DC with 5GC includes NG-RAN E-UTRA-NR Dual Connectivity (NGEN-DC) and NR-E-UTRA Dual Connectivity (NE-DC), and the main differences are as follows: being connected to the 5G Core (5GC), which network element is the master node and which network element is the secondary node.

In the existing technology, an SN Change initiated by a secondary node (SN) in a dual connectivity scenario notifies a master node (MN) to perform an SN Add operation to a target SN. When the SN decides to initiate the SN Change, reference is made only to the relevant factors such as signal quality, which necessitates improvement.

SUMMARY

At least one of the embodiments of the present disclosure provides an information management method, a secondary node changing method, a node, and a non-transitory computer-readable storage medium.

At least one of the embodiments of the present disclosure provides an information management method, which may include: recording, after a secondary node is added to user equipment, history information for the user equipment by the secondary node.

At least one of the embodiments of the present disclosure provides an information management method, which may include: sending, by a master node, history information for user equipment to a secondary node, in a secondary node change or modify process.

At least one of the embodiments of the present disclosure provides a secondary node changing method, which may include: selecting, in response to a secondary node initiating secondary node change, a target secondary node according to history information for user equipment.

At least one of the embodiments of the present disclosure provides a node which may include a memory and a processor, where the memory stores a program which, when read and executed by the processor, causes the processor to perform an information management method according to any of the embodiments.

At least one of the embodiments of the present disclosure provides a non-transitory computer-readable storage medium, where the non-transitory computer-readable storage medium stores one or more programs which are executable by one or more processors to implement an information management method according to any of the embodiments.

At least one of the embodiments of the present disclosure provides a node which may include a memory and a processor, where the memory stores a program which, when read and executed by the processor, causes the processor to perform a secondary node changing method according to any of the embodiments.

At least one of the embodiments of the present disclosure provides a non-transitory computer-readable storage medium, where the non-transitory computer-readable storage medium stores one or more programs which are executable by one or more processors to implement a secondary node changing method according to any of the embodiments.

DETAILED DESCRIPTION

The embodiments of the present disclosure will be described below in combination with the accompanying drawings. Any combinations of embodiments and features of the embodiments of the present disclosure without conflict are possible.

The steps shown in the flowcharts of the drawings may be performed in a computer system, such as with a set of computer-executable instructions. Moreover, although a logical order is shown in the flowcharts, the steps shown or described may be performed, in some cases, in a different order from that shown or described herein.

In an embodiment of the present disclosure, there is provided an information management method applicable to dual connectivity systems, where the method is used to record and transmit history information for user equipment in an SpCell of a secondary cell group (PScell) on the SN side to assist in SN Change decision-making, so as to select a better target SN and enhance the robustness of the system.

An embodiment of the present disclosure provides a managing method for history information for user equipment in a dual connectivity system, including the following steps: storing, by an SN, history information carried from an MN; recording history information in the current SN; bringing the history information in the SN to the MN; and selecting, by the SN, a target SN with reference to the history information to trigger an SN Change process.

Figure 1:
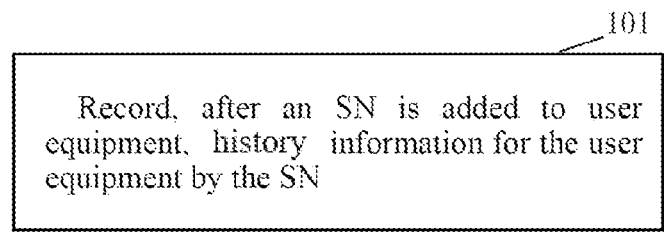
FIG. 1 is a flowchart (SN side) of an information management method provided by an embodiment of the present disclosure.

As shown in FIG. 1, an embodiment of the present disclosure provides an information management method, including the following step.

At step 101, after an SN is added to user equipment (UE), the SN records history information for the user equipment.

At least one of the embodiments of the present disclosure provides an information management method, including the following step: after a secondary node is added to user equipment, the secondary node records the current history information for the user equipment. According to the scheme provided in this embodiment, the history information for the user equipment is recorded so as to facilitate subsequent use of the history information.

Upon successful addition of the SN to the UE, the history information in a PScell is recorded by the SN, including history information after a PScell change due to PScell-Change in this process, until the SN is changed or deleted.

In an embodiment, the SN includes, but is not limited to, a Secondary gNodeB (SgNB) and a Secondary eNodeB (SeNB).

In an embodiment, the content contained in the history information is consistent with that defined in the current protocol, including historical access cell information, which includes information such as cell system, cell identification, cell type, and residence time in the current cell. The current history information for the user equipment refers to the information for the user equipment in a residence cell under the current SN.

In an embodiment, the method further includes the following step: in response to the SN receiving history information for the user equipment under other SNs sent by an MN, the history information for the user equipment under the other SNs is stored. In an embodiment, the SN is a target SN, and the MN initiates an SN Add process, at which time the MN carries the history information to the target SN through an SN Addition Request message.

In an embodiment, the method further includes the following step: the SN sends the history information for the user equipment to the MN in an SN change or modify process. In an embodiment, the source SN carries the history information to the MN in an SN Change or SN Modify process, where in the SN Change process, the history information may be carried by an SN Change Required message; and in the SN Modify process, the history information may be carried by an SN Modification Request Acknowledge message.

In an embodiment, the history information sent by the SN to the MN includes the history information for the user equipment recorded by the SN itself (including the history information for the user equipment under the secondary node and the history information for the user equipment before the secondary node being added), or includes the history information for the user equipment under the SN recorded by the SN itself and the history information for the user equipment under the other SNs received by the SN. The history information transmitted by the source SN includes history information carried from other MNs to the source SN and history information newly recorded by the source SN itself, which is the accumulation of history information. In an embodiment, in response to the number of pieces of the recorded history information exceeding a limited number, some records are deleted, for example, the oldest records are eliminated in order. The limited number may be set as required.

Figure 2:
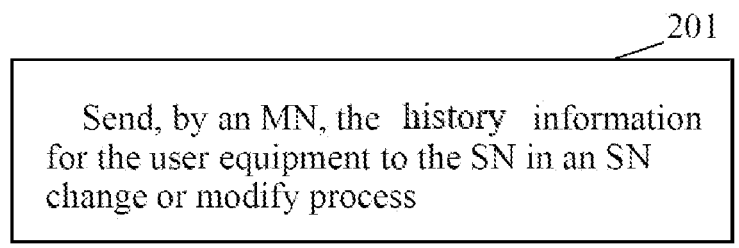
FIG. 2 is a flowchart (MN side) of an information management method provided by an embodiment of the present disclosure.

As shown in FIG. 2, an embodiment of the present disclosure provides an information management method, including the following step.

At step 201, the MN sends the history information for the user equipment to the SN in the SN change or modify process.

In an embodiment, the history information for the user equipment may be carried in an SN ADD request.

In an embodiment, the MN acquires the history information for the user equipment from the source SN.

In an embodiment, the MN sending the history information for the user equipment to the SN in the SN change or modify process includes the following step: the MN sends the history information for the user equipment to a target SN in the SN change or modify process.

In an embodiment, the MN sending the history information for the user equipment to the secondary node in the secondary node change or modify process includes the following step: the MN is a source MN, the source MN sends the history information for the user equipment to the target MN in the SN change or modify process, and the target MN sends the history information for the user equipment to the target SN.

Figure 3:
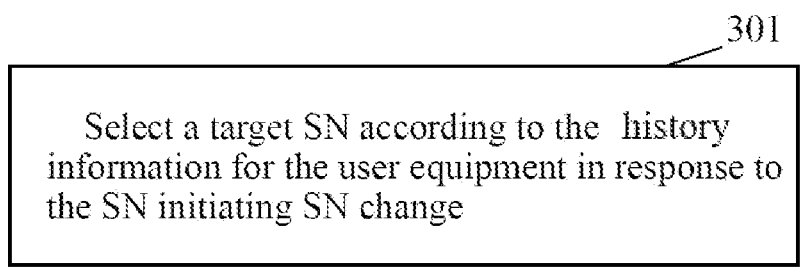
FIG. 3 is a flowchart of a secondary node changing method provided by an embodiment of the present disclosure.

As shown in FIG. 3, an embodiment of the present disclosure provides a secondary node changing method, including the following step.

At step 301, in response to an SN initiating SN change, a target SN is selected according to history information for user equipment.

When the SN decides to initiate SN Change, it needs to select a target SN. At this moment, besides reference to signal quality, reference may be made to history information so as to select a better SN for change. According to the system implementation, a set of selection algorithms may be provided, for example, under the condition of equal signal quality, with reference to the residence time of the cell, an SN with longer residence time is selected as the target SN, etc., and the selection algorithm may be set as required, which is not limited in the present disclosure.

In an embodiment, the method further includes the following step: the SN acquires the history information for the user equipment from the MN.

In the scheme provided by this embodiment, by recording and transmitting the history information for the user equipment in the SN and referring to the history information when the SN initiates the SN Change decision-making, the target side of the SN Change is selected, thereby enhancing the robustness of the system.

Figure 4:
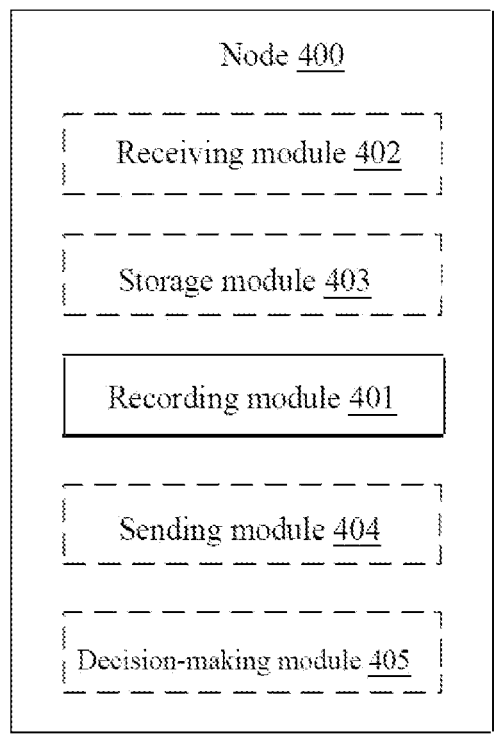
FIG. 4 is a block diagram of a node provided by an embodiment of the present disclosure.

An embodiment of the present disclosure provides a node 400 as shown in FIG. 4, which is a schematic diagram and does not limit the implementation of the node. When the node serves as the SN side under the dual connection, the node 400 includes: a recording module 401.

The recording module 401 is configured to be responsible for recording the history information in the current SN after the SN is successfully added, including the whole historical trajectory of changes of PScell in the SN.

In an embodiment, the node 400 further includes a receiving module 402 and a storage module 403.

The receiving module 402 is configured to receive the history information for the user equipment under the SN sent by the MN, where the history information may be carried in an SN Add request message.

The storage module 403 is configured to store the history information for the user equipment under the SN.

In an embodiment, the node 400 further includes: a sending module 404 that is configured to send the history information for the UE to the MN when the SN initiates SN Change. For example, the history information is carried in an SN Change request message.

In an embodiment, the node 400 further includes: a decision-making module 405 that is configured to make a decision according to the history information for the UE to determine the target SN when initiating SN Change, where a preset algorithm may be used to select an optimal target SN.

The present disclosure is illustrated below by several application examples.

Figure 5A:
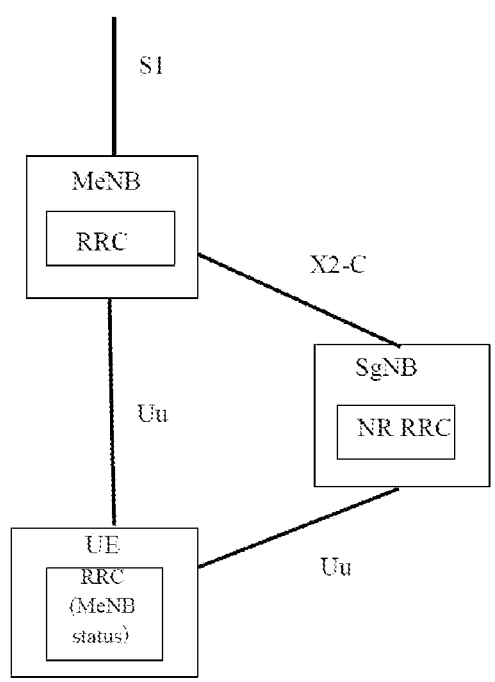
FIG. 5a is a schematic diagram of a control plane architecture in an EN-DC scenario provided by an embodiment of the present disclosure.

An embodiment of the present disclosure provides a secondary node changing method. This embodiment involves an EN-DC scenario, as shown in FIG. 5a. In the EN-DC scenario, only the eNB (i.e., the MeNB in FIG. 5a, the master node MN in this embodiment) has an S1-C signalling connection with the Evolved Packet Core (EPC), while the SgNB (the secondary node SN in this embodiment) has no signalling connection with the EPC. EN-DC related signalling is exchanged between the eNB and the gNB through X2-C. There is a signalling connection between the UE and the LTE for use in exchange of Radio Resource Control (RRC) signalling and Non-Access-Stratum (NAS) signalling. RRC signalling exchange with the SgNB may also be performed after the SgNB connection is successfully established.

Figure 5B:
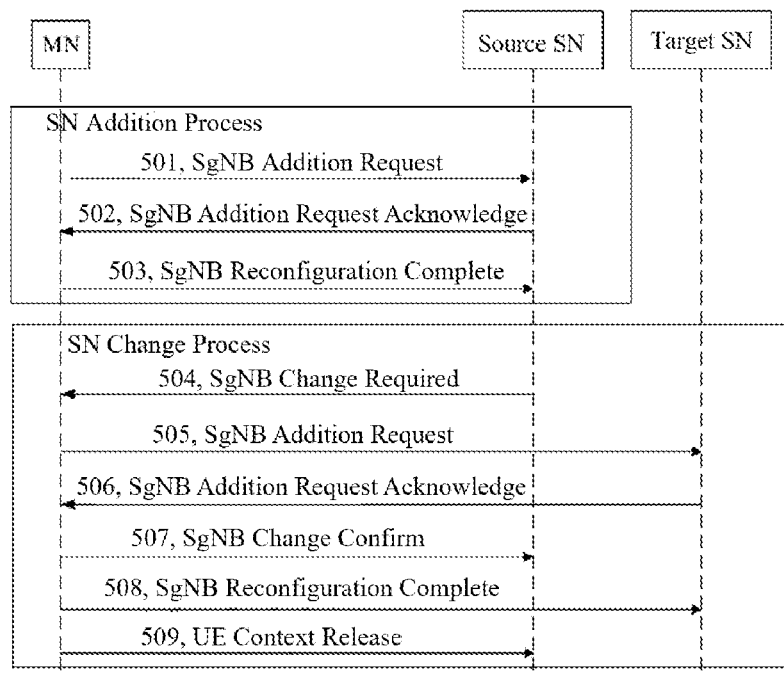
FIG. 5b is a flowchart of the triggering of SN Change by an SN in an EN-DC scenario provided by an embodiment of the present disclosure.

As shown in FIG. 5b, the following steps are included.

At step 501, upon successful access of the UE at the MN, the MN sends an SgNB Addition Request message to the SN (the source SN in this embodiment) to request the addition of the SN. Since it is the first time to add the SN, no history information for the SN is carried.

At step 502, the source SN replies to the MN with an SgNB Addition Request Acknowledge message to confirm the addition of the SN.

At step 503, upon successful reconfiguration of the UE at the MN side, the MN sends an SgNB Reconfiguration Complete message to the source SN to notify the source SN of the successful reconfiguration, and then the source SN may start recording the history information in the current PScell.

At step 504, when the source SN initiates the SN Change process, there is no history information for reference (at this moment, there is only history information recorded by the source SN itself, but no history information from other SNs). The source SN sends an SgNB Change Required message to the MN to request SN Change, which carries the history information in PScell of the source SN.

At step 505, the MN sends an SgNB addition request message to the target SN to request the addition of the SN, which carries the history information in the source SN.

At step 506, the target SN replies to the MN with an SgNB Addition Request Acknowledge message to confirm the addition of the SN.

At step 507, the MN replies to the source SN with an SgNB Change Confirm message to confirm SN Change.

At step 508, upon successful reconfiguration of the UE at the MN side, the MN sends an SgNB Reconfiguration Complete message to the target SN to notify the target SN of the successful reconfiguration, and then the target SN may start recording the history information in the current PScell. When making subsequent decisions on SN Change, the target SN makes reference to the history information carried from the source SN, so as to select the next target SN, and carries the history information in the source SN (the history information acquired from the source SN) and the history information in the target SN (the history information recorded by the target SN) in the SgNB Change Required message sent by the target SN to the MN in the SN Change process.

At step 509, the MN sends a UE Context Release message to the source SN to notify the SN to release the UE context.

Figure 6:
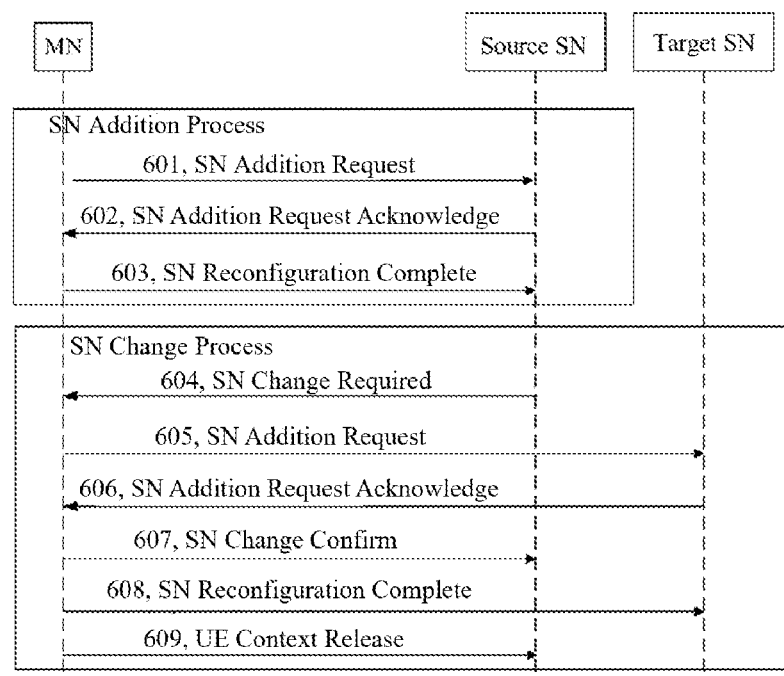
FIG. 6 is a flowchart of the triggering of SN Change by an SN in an MR-DC scenario connected with 5GC provided by an embodiment of the present disclosure.

As shown in FIG. 6, an embodiment of the present disclosure provides an implementation of triggering SN Change by an SN in an MR-DC scene connected with 5GC, which includes the following steps.

At step 601, upon successful access of UE at an MN, the MN sends an SN Addition Request message to an SN (this SN is denoted as the source SN in this embodiment) to request the addition of the SN. Since it is the first time to add the SN, no history information for the SN is carried.

At step 602, the source SN replies to the MN with an SN Addition Request Acknowledge message to confirm the addition of the SN.

At step 603, upon successful reconfiguration of the UE at the MN side, the MN sends an SN Reconfiguration Complete message to the source SN to notify the source SN of the successful reconfiguration, and then the source SN may start recording the history information in the current PScell.

At step 604, when the source SN initiates the SN Change process, there is no history information for reference (there is only the history information recorded by the source SN itself). The source SN sends an SN Change Required message to the MN to request SN Change, which carries the history information in the PScell of the source SN.

At step 605, the MN sends an SN Addition Request message to the target SN to request the addition of the SN, which carries the history information in the source SN.

At step 606, the target SN replies to the MN with an SN Addition Request Acknowledge message to confirm the addition of the SN.

At step 607, the MN replies to the source SN with an SN Change Confirm message to confirm SN Change.

At step 608, upon successful reconfiguration of the UE at the MN side, the MN sends an SN Reconfiguration Complete message to the target SN to notify the target SN of the successful reconfiguration, and then the target SN may start recording the history information in the current PScell. When making subsequent decisions on SN Change, the target SN makes reference to the history information carried from the source SN, so as to select the next target SN, and carries the history information in the source SN and in the target SN in the SN Change Required message sent by the target SN to the MN in the SN Change process.

At step 609, the MN sends a UE Context Release message to the source SN to notify the SN to release the UE context.

Figure 7:
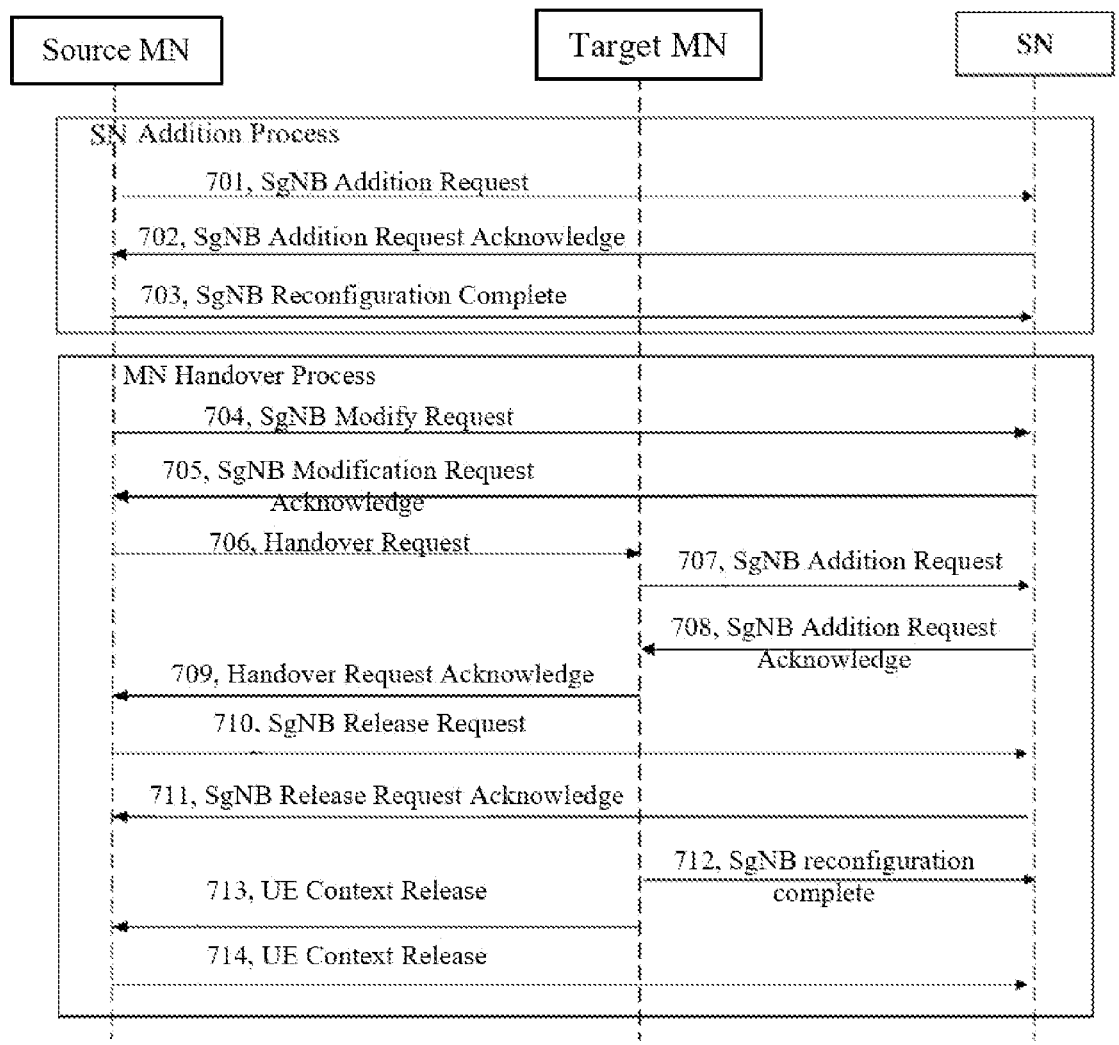
FIG. 7 is a flowchart of an MN handover with SN (SN unchanged) in an EN-DC scenario provided by an embodiment of the present disclosure.

As shown in FIG. 7, the following steps are included.

At step 701, upon successful access of the UE at the MN (this MN is the source MN in this embodiment, which will be referred to as the source MN), the source MN sends an SgNB Addition Request message to the SN to request the addition of the SN. Since it is the first time to add the SN, no history information for the SN is carried.

At step 702, the SN replies to the source MN with an SgNB Addition Request Acknowledge message to confirm the addition of the SN.

At step 703, upon successful reconfiguration of the UE at the source MN side, the source MN sends an SgNB Reconfiguration Complete message to the SN to notify the SN of the successful reconfiguration, and then the SN may start recording the history information in the current PScell.

At step 704, before the source MN initiates a handover, it needs to trigger the SN Modify process, and the source MN sends an SgNB Modification Request message to the SN to request SN configuration information.

At step 705, the SN replies to the source MN with an SgNB Modification Request Acknowledge message, which carries the history information in PScell of the SN.

At step 706, the source MN sends a Handover Request message to the target MN to initiate the handover, and the history information in the SN is carried in UE context information.

At step 707, the target MN initiates an SN addition process, and the target MN sends an SgNB Addition Request to the SN, which also carries the history information in the SN.

At step 708, if the SN identifies the same UE and that PScell remains unchanged, it will continue to record the residence time in the current cell; otherwise, if PScell changes, it will re-record the information in the new cell, and the SN will reply an SN Addition Request Acknowledge message to the target MN.

At step 709, the target MN replies to the source MN with a Handover Request Acknowledge message.

At step 710, the source MN initiates the release preparation process of the SN, and the source MN sends an SgNB Release Request to the SN.

At step 711, the SN sends an SgNB Release Request Acknowledge message to the source MN.

At step 712, upon successful reconfiguration of the UE at the target MN side, the target MN sends an SN Reconfiguration Complete message to the SN to notify the SN of the successful reconfiguration.

At step 713, the target MN sends a UE Context Release message to the source MN to notify the source MN to initiate UE context release.

At step 714, the source MN initiates UE context release of the SN, and the source MN sends a UE Context Release message to the SN.

Figure 8:
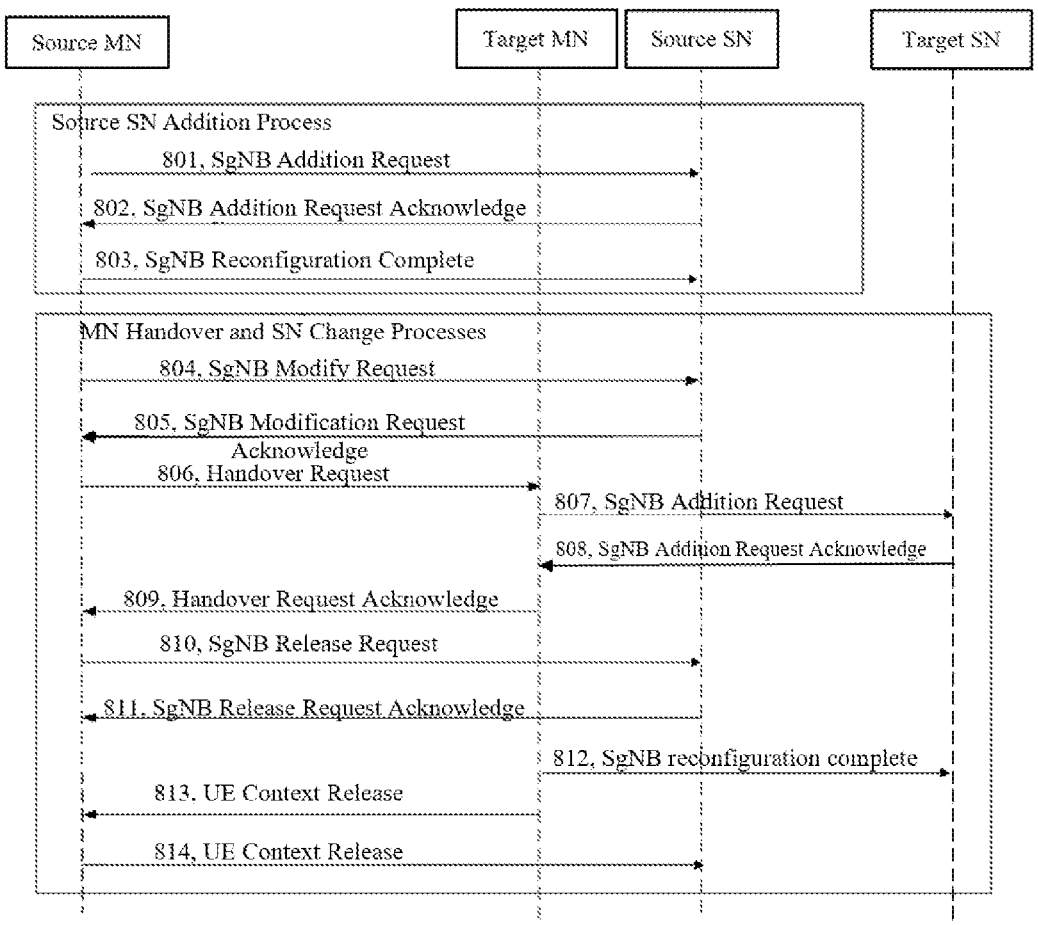
FIG. 8 is a flowchart of an MN handover with SN (SN changed) in an EN-DC scenario provided by an embodiment of the present disclosure.

As shown in FIG. 8, the following steps are included.

At step 801, upon successful access of the UE at the MN (which is referred to as the source MN in this embodiment), the source MN sends an SgNB Addition Request message to the SN (referred to as the source SN in the subsequent steps) to request the addition of the SN. Since it is the first time to add the SN, no history information for the SN is carried.

At step 802, the source SN replies to the source MN with an SgNB Addition Request Acknowledge message to confirm the addition of the SN.

At step 803, upon successful reconfiguration of the UE at the source MN side, the source MN sends an SgNB Reconfiguration Complete message to the source SN to notify the source SN of the successful reconfiguration, and then the source SN may start recording the history information in the current PScell.

At step 804, before the source MN initiates the handover, it needs to trigger the SN Modify process, and the source MN sends an SgNB Modification Request message to the source SN to request SN configuration information.

At step 805, the source SN replies to the source MN with an SgNB Modification Request Acknowledge message, which carries the history information in PScell in the source SN.

At step 806, the source MN sends a Handover Request message to the target MN to initiate the handover, and the history information for the UE in the source SN is carried in UE context information.

At step 807, the target MN initiates an addition process to the target SN, and the target MN sends an SgNB Addition Request to the target SN, which also carries the history information in the source SN.

At step 808, the target SN sends an SN Addition Request Acknowledge message to the target MN, and the target SN records the history information for the UE in the current SN.

At step 809, the target MN replies to the source MN with a Handover Request Acknowledge message.

At step 810, the source MN initiates the release preparation process of the source SN, and the source MN sends an SgNB Release Request to the source SN.

At step 811, the source SN sends an SgNB Release Request Acknowledge message to the source MN.

At step 812, upon successful reconfiguration of the UE at the target MN side, the target MN sends an SN Reconfiguration Complete message to the target SN to notify the target SN of the successful reconfiguration.

At step 813, the target MN notifies the source MN to initiate UE context release, and the target MN sends a UE Context Release message to the source MN.

At step 814, the source MN initiates UE context release of the source SN, and the source MN sends a UE Context Release message to the source SN.

Those having ordinary skills in the art should understand that the dual connectivity according to the embodiments of the present disclosure is not limited to the dual connectivity between LTE and 5G, but also can be applied to the dual connectivity within 5G communication.

Figure 9:
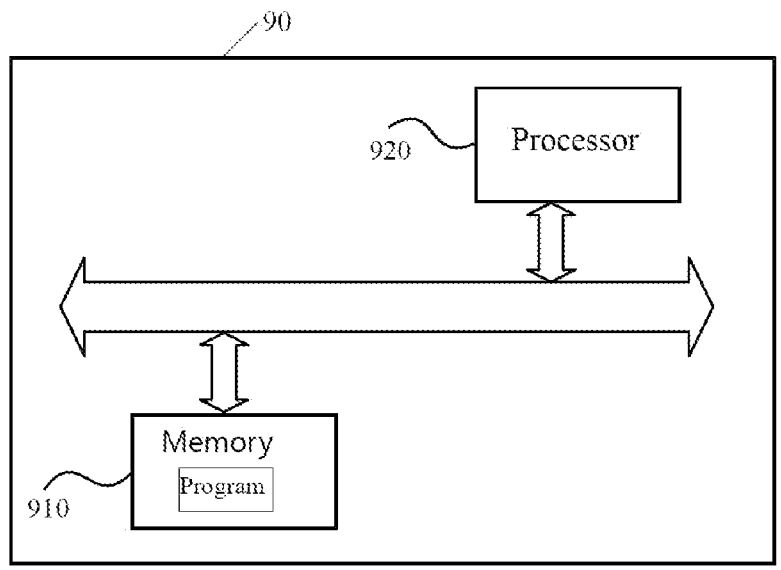
FIG. 9 is a block diagram of a node provided by an embodiment of the present disclosure.

As shown in FIG. 9, an embodiment of the present disclosure provides a node 90 including a memory 910 and a processor 920, where the memory 910 stores a program which, when read and executed by the processor 920, causes the processor 920 to perform an information management method according to any of the embodiments.

Figure 10:
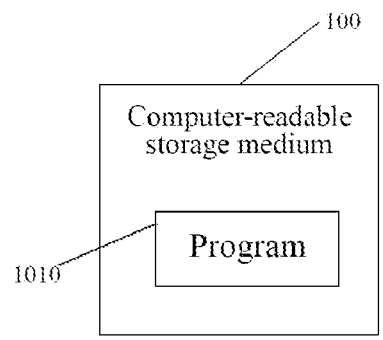
FIG. 10 is a block diagram of a non-transitory computer-readable storage medium provided by an embodiment of the present disclosure.

As shown in FIG. 10, an embodiment of the present disclosure provides a non-transitory computer-readable storage medium 100, where the non-transitory computer-readable storage medium 100 stores one or more programs 1010, and the one or more programs 1010 are executable by one or more processors to implement an information management method according to any of the embodiments.

Figure 11:
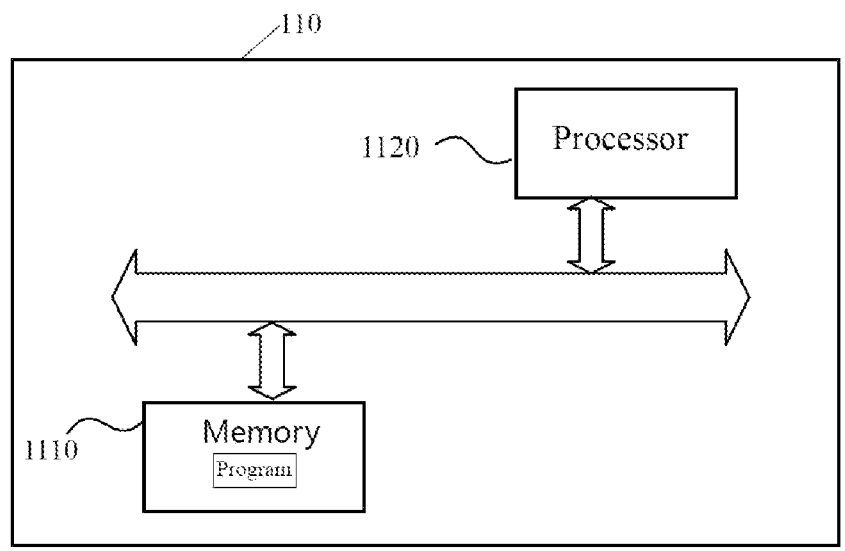
FIG. 11 is a block diagram of a node provided by another embodiment of the present disclosure.

As shown in FIG. 11, an embodiment of the present disclosure provides a node 110 including a memory 1110 and a processor 1120, where the memory 1110 stores a program which, when read and executed by the processor 1120, causes the processor 1120 to perform a secondary node changing method according to any of the embodiments.

Figure 12:
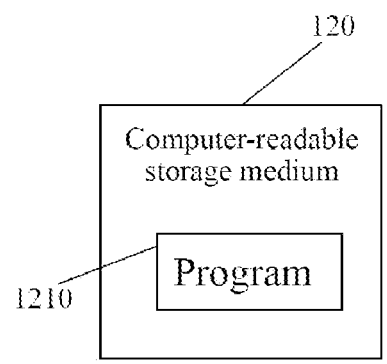
FIG. 12 is a block diagram of a non-transitory computer-readable storage medium provided by another embodiment of the present disclosure.

As shown in FIG. 12, an embodiment of the present disclosure provides a non-transitory computer-readable storage medium 120, where the non-transitory computer-readable storage medium 120 stores one or more programs 1210, and the one or more programs 1210 are executable by one or more processors to implement a secondary node changing method according to any of the embodiments.

All or some of the steps of the methods, systems and functional modules/units in the devices disclosed above can be implemented as software, firmware, hardware and any appropriate combinations thereof. In the hardware implementation, the division between functional modules/units mentioned in the above description does not necessarily correspond to the division of physical components; for example, a physical component may have multiple functions, or a function or step may be performed cooperatively by a plurality of physical components. Some or all of the components may be implemented as software executed by a processor, such as a digital signal processor or a microprocessor, or as hardware, or as an integrated circuit, such as an application specific integrated circuit. Such software can be distributed on computer-readable media, which can include computer storage media (or non-transitory media) and communication media (or transitory media). Computer storage media include volatile and nonvolatile, removable and non-removable media implemented in any method or technology for storing information, such as computer-readable instructions, data structures, program modules or other data. The computer storage media include, but are not limited to, random access memory (RAM), read-only memory (ROM), electrically erasable programmable read-only memory (EEPROM), flash memory or other memory technologies, compact disc read-only memory (CD-ROM), digital versatile disk (DVD) or other optical disc storage, cassettes, magnetic tapes, magnetic disc storage or other magnetic storage devices, or any other media that can be configured to store desired information and can be accessed by computers. Communication media typically contain computer-readable instructions, data structures, program modules or other data in a modulated data signal such as a carrier wave or other transmission mechanism, and can include any information delivery media.

The invention claimed is:

1. An information management method, comprising:
    recording, after a secondary node is added to user equipment, first history information for the user equipment in a Primary Secondary Cell (PScell) by the secondary node;
    storing, in response to the secondary node receiving second history information for the user equipment under other secondary nodes sent by a master node, the second history information for the user equipment under the other secondary nodes by the secondary node; and
    in response to the secondary node determining to initiate a secondary node change or modify process, sending a secondary node change request message to the master node and selecting a target secondary node according to third history information comprising the first history information and the second history information for the user equipment.

2. The information management method of claim 1, further comprising:
    sending, by the secondary node, the third history information for the user equipment to the master node, in the secondary node change or modify process.

3. An information management method, comprising:
    sending, by a master node, second history information for user equipment under other secondary nodes to a secondary node, in a secondary node change or modify process;
    storing, in response to the secondary node receiving the second history information for the user equipment under other secondary nodes sent by the master node, the second history information for the user equipment under the other secondary nodes by the secondary node; and
    in response to the secondary node determining to initiate the secondary node change or modify process, sending a secondary node change request message to the master node and selecting a target secondary node according to third history information comprising first history information for the user equipment in a Primary Secondary Cell (PScell) recorded by the secondary node and the second history information for the user equipment.

4. The information management method of claim 3, further comprising:
    acquiring, by the master node, the first history information for the user equipment, from a source secondary node.

5. The information management method of claim 3, further comprising:
    sending, by the master node, the first history information for the user equipment to a target secondary node, in the secondary node change or modify process.

6. The information management method of claim 3, wherein, the master node is a source master node; and
    the secondary node change or modify process further comprises:
        sending, by the source master node, the first history information for the user equipment to a target master node, and
        sending, by the target master node, the first history information for the user equipment to a target secondary node.

7. A secondary node changing method, comprising:
    in response to a secondary node determining to initiate a secondary node change or modify process, sending a secondary node change request message to a master node and selecting a target secondary node according to third history information comprising first history information for user equipment in a Primary Secondary Cell (PScell) recorded by the secondary node and second history information for user equipment under other secondary nodes; and
    storing, by the secondary node, in response to the secondary node receiving the second history information for the user equipment under other secondary nodes sent by the master node, the second history information for the user equipment under the other secondary nodes.

8. The secondary node changing method of claim 7, further comprising: acquiring, by the secondary node, the first second history information for the user equipment from the master node.

9. A node comprising a memory and a processor, wherein the memory stores a program which, when read and executed by the processor, causes the processor to perform an information management method comprising:
   recording, after a secondary node is added to user equipment, first history information for the user equipment in a Primary Secondary Cell (PScell) by the secondary node;
   storing, in response to the secondary node receiving second history information for the user equipment under other secondary nodes sent by a master node, the second history information for the user equipment under the other secondary nodes by the secondary node; and
   in response to the secondary node determining to initiate a secondary node change or modify process, sending a secondary node change request message to the master node and selecting a target secondary node according to third history information comprising the first history information and the second history information for the user equipment.

10. A non-transitory computer-readable storage medium, wherein the non-transitory computer-readable storage medium stores one or more programs which are executable by one or more processors to implement the information management method of claim 1.

11. A non-transitory computer-readable storage medium, wherein the non-transitory computer-readable storage medium stores one or more programs which are executable by one or more processors to implement the secondary node changing method of claim 7.

12. The information management method of claim 4, wherein
   the secondary node change or modify process further comprises:
   sending, by the master node, the first history information for the user equipment to a target secondary node, in the secondary node change or modify process.

13. The information management method of claim 4, wherein, the master node is a source master node; and
   the secondary node change or modify process further comprises:
      sending, by the source master node, the first history information for the user equipment to a target master node, and
      sending, by the target master node, the first history information for the user equipment to a target secondary node.

14. A non-transitory computer-readable storage medium, wherein the non-transitory computer-readable storage medium stores one or more programs which are executable by one or more processors to implement the information management method of claim 3.

15. A non-transitory computer-readable storage medium, wherein the non-transitory computer-readable storage medium stores one or more programs which are executable by one or more processors to implement the secondary node changing method of claim 8.

* * * * *